Figures 5, 6:
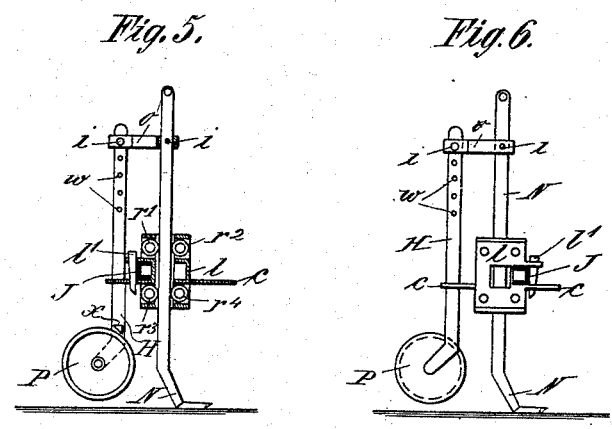

(No Model.) 6 Sheets—Sheet 1.
C. GINDLER.
HORSE HOE.
No. 527,419. Patented Oct. 16, 1894.
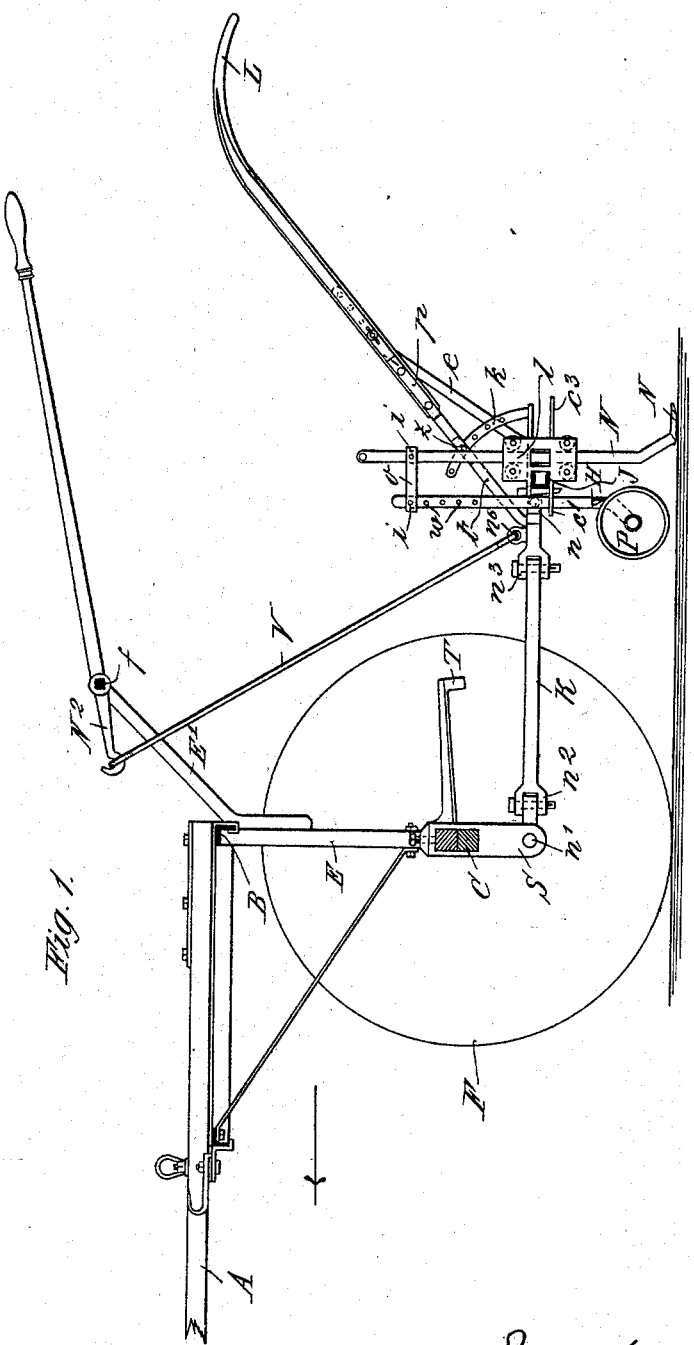
Witnesses:
W. C. Pinckney
W. E. Bowen
Inventor:
Carl Gindler,
By J. E. M. Bowen
Atty.

(No Model.)
C. GINDLER.
HORSE HOE.
No. 527,419.
6 Sheets—Sheet 2.
Patented Oct. 16, 1894.
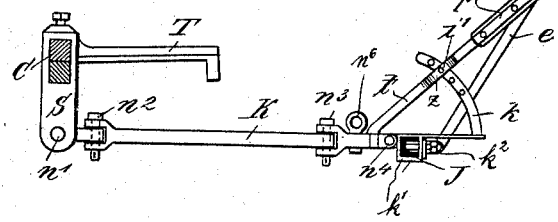
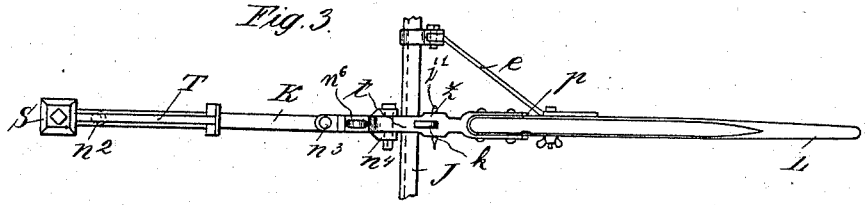
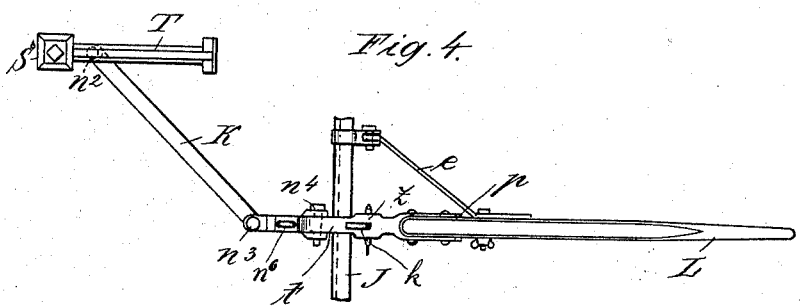

(No Model.)  6 Sheets—Sheet 3.

C. GINDLER.
HORSE HOE.

No. 527,419. Patented Oct. 16, 1894.

(No Model.) 6 Sheets—Sheet 4.

C. GINDLER.
HORSE HOE.

No. 527,419. Patented Oct. 16, 1894.

Witnesses:
M. C. Pinckney
C. L. Horack

Inventor:
Carl Gindler,
By J. E. M. Bowen
Atty.

(No Model.) 6 Sheets—Sheet 5.

C. GINDLER.
HORSE HOE.

No. 527,419. Patented Oct. 16, 1894.

Witnesses:
M. C. Pinckney
W. O. Bowen

Inventor:
Carl Gindler
By J. S. M. Bowen
Atty.

(No Model.)
C. GINDLER.
HORSE HOE.
No. 527,419.  Patented Oct. 16, 1894.
6 Sheets—Sheet 6.
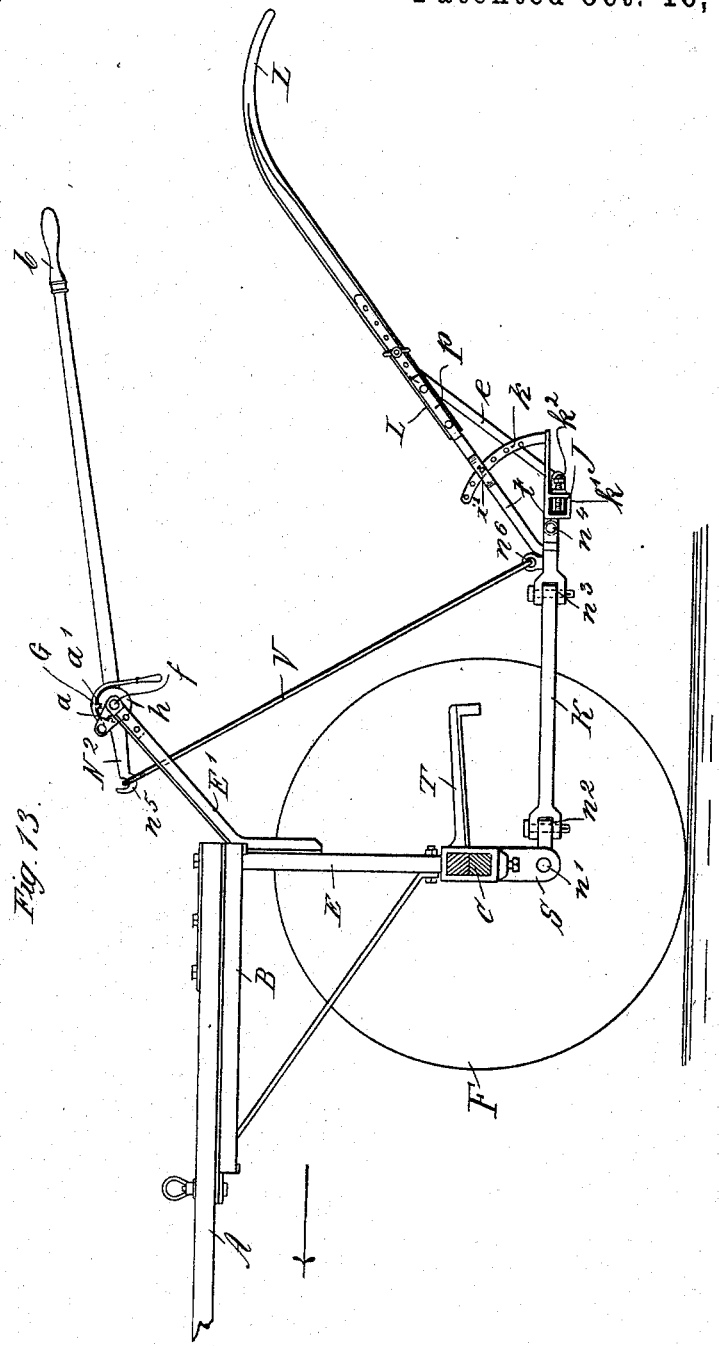
Witnesses:—
H. C. Pinckney
W. E. Bowen
Inventor:—
Carl Gindler,
By J. E. M. Bowen
Atty.
THE NORRIS PETERS CO., PHOTO-LITHO., WASHINGTON, D. C.

UNITED STATES PATENT OFFICE.

CARL GINDLER, OF SALZGITTER, GERMANY.

HORSE-HOE.

SPECIFICATION forming part of Letters Patent No. 527,419, dated October 16, 1894.

Application filed January 31, 1894. Serial No. 498,598. (No model.) Patented in Germany March 17, 1892, No. 73,391.

*To all whom it may concern:*

Be it known that I, CARL GINDLER, a subject of the King of Prussia, German Emperor, residing at Salzgitter, in the Province of Hanover, Kingdom of Prussia, Germany, have invented certain new and useful Improvements in Horse-Hoes, of which the following is a specification.

My invention was patented in Germany March 17, 1892, No. 73,391, and relates to horse-hoes adapted for working upon either level or unlevel ground. The regulating mechanism is placed at the rear, and can be adjusted to work in any desired position horizontally, and is capable of being set out at the same time in a horizontal direction laterally to the extent of half a meter on either side, with the object of rendering a special front regulating mechanism unnecessary, and of allowing the machine to work properly, even in case the draft animal should suddenly swerve considerably from the direction of the rows of plants, especially in an oblique plane. The hoeing-tines have in all positions a depth of cut which is controllable and is always equally great. This is attained by the connection of two jointed and in the working position horizontally arranged guide levers, with a horizontal tine or share carrier which is jointed to the latter and rigid, and always takes up a position at right angles to the direction of travel, and to which are attached casings which are capable of being shifted or located at will, each of such casings receiving the stem of one tine or share and guiding it vertically by means of a grooved roller, the stem of each share being at the same time so connected to that of a caster wheel that upon uneven ground the share and wheel rise and fall together.

To enable my invention to be fully understood I will describe how it can be carried into practice by reference to the accompanying drawings, in which—

Figure 10:
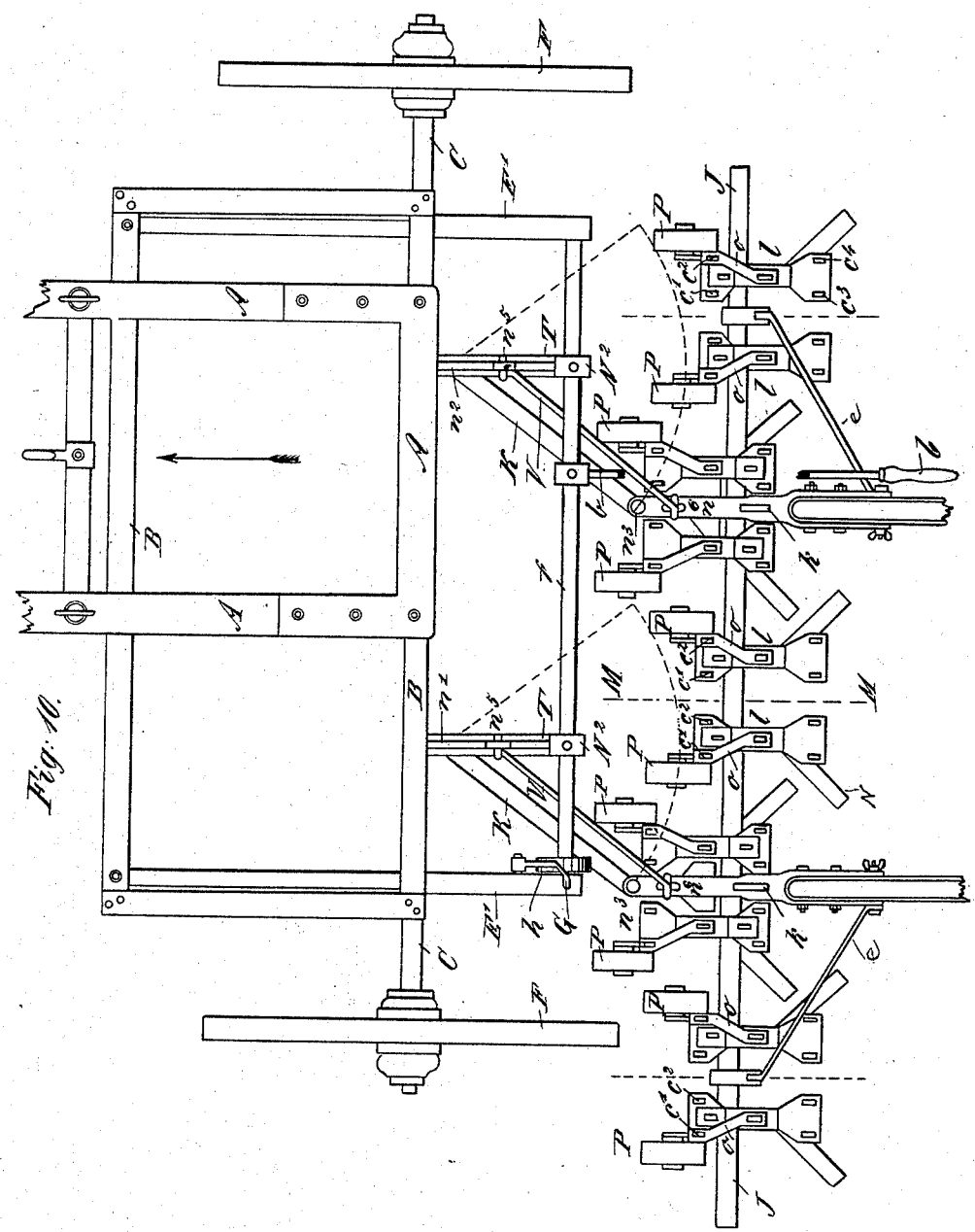
Figure 11:
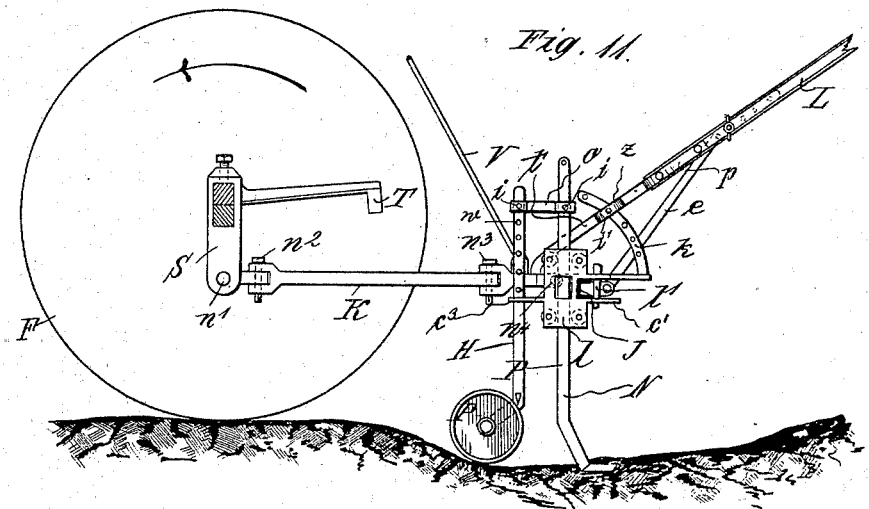
Figure 12:
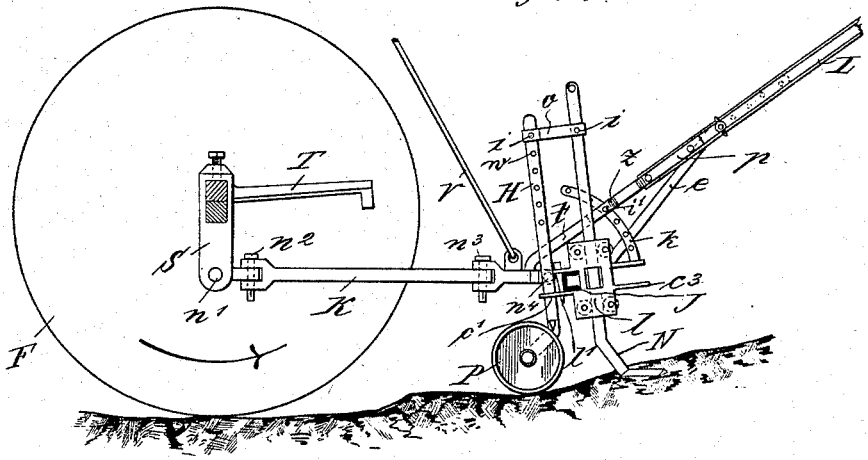

Figure 1 is a longitudinal section of a horse-hoe constructed according to my invention the section being taken on the line M—M of Fig. 10. Figs. 2 to 9 are views of details of the regulating and hoeing mechanism. Fig. 10 is a plan of the machine. Figs. 11 and 12 are elevations respectively illustrating the two positions of the share or tine, caster wheel, and regulating lever when working up a hill or slope and in a depression in the land. Fig. 13 is a sectional side elevation of the machine, showing the means for securing a permanently horizontal position in working, and also the arrangement for raising and locking the rear regulating mechanism for transport.

To the frame B carried by the extensible axle C of the traveling wheels F, the shafts A are so attached as to be capable of being shifted and locked, to blocks S which carry forked brackets T (Figs. 2 and 3). These blocks have jointed to them two guiding bars K provided with handles L, and each of these guiding bars has joints at four points $n'$, $n^2$, $n^3$, $n^4$, the handles L being attached by arms $t$ to the parts of bars K located between joints $n^3$ and $n^4$. Arms $t$ are forked at $p$ to embrace handles L.

The rear ends of the guiding bars K carry through the intervention of the joints $n^4$ a rigid beam J to which are attached, in such a way as to be adjustable at will and capable of being locked by means of wedges $l'$ at any desired distance apart, several casings $l$ (Figs. 1, 5, 6 and 7). Each of these casings $l$ is provided with four grooved rollers $r'$, $r^2$, $r^3$, $r^4$, Fig. 5, which allow the stems of the shares to slide easily, and to guide them vertically that the shares N cannot rotate when in work, but are compelled to act always in a direction parallel to that of the draft of the machine.

Figures 7, 8, 9:
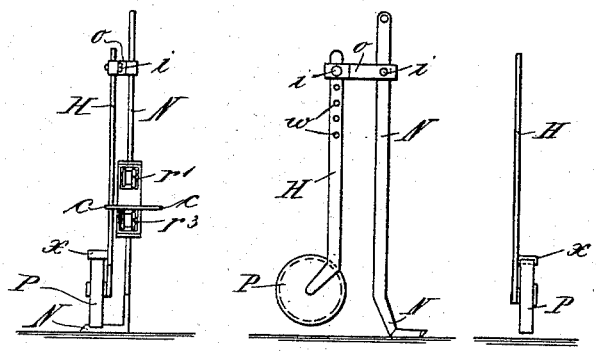

To the upper part of the stem of each share there is connected by means of a bracket $o$ and screw bolts $i$, the upper part of the stem H of a caster wheel P, and this stem is guided parallel to the stem of the share by means of a slot $c'$, $c^2$, $c^3$, $c^4$ (Fig. 10) in the casing $l$. The caster wheels P which always precede their respective shares, are intended to give the same depth of cut to each share, and to this end the shares N are so adjusted with reference to their caster wheels P, that extend beyond the latter downward to a given distance. The wheels P are cleaned by a scraper $x$ fixed to the stem H, as shown in Figs. 5, 7 and 9.

Since the caster wheels and shares are so guided, as regards their stems as to slide easily and vertically in their casings, each caster wheel adapts itself easily to the condition of the surface of the ground at any given moment, and thus determines the depth of cut of the share which is connected with it.

In order that the depth of cut of the shares may be regulated according to the requirement of the case, a row of holes $w$ placed above one another is provided in the stem H of the caster wheels (Fig. 6), so that by placing the bolt $i$, which passes through the bracket $o$, in a higher or lower hole, the shares are caused to cut more or less deeply.

In order that the direction of the cut may be properly adjusted, according to requirement, the rigid beam J is provided with quadrants $k$ opposite to the points where it is jointed to the two regulating or guiding bars K in which quadrant several holes are drilled (Fig. 2).

Each quadrant K is rigidly attached to an arm extending from a square sleeve K' which latter is mounted and capable of sliding on beam J. K² is a set screw for holding said sleeve in its proper place. An eye is provided in connection with said sleeve through which passes the bolt of joint $n^4$, as shown in Figs. 2 and 13. By causing the rigid beam to rotate at the points $n^4$ at which it is jointed, and by the connection of the quadrants $k$ with the handles L, which are rigidly connected to the guiding bar E with the co-operation of the connecting bolts $i'$ placed in the higher or lower holes of the quadrants $k$, the shares are caused to take up a position more or less inclined to the guiding bars.

The quadrants K are guided in an eye Z of the arm $t$. Moreover the rigid beam J is connected by the links $e$ with the handles L, the links being pivoted to the beam J and connected with the handles by a thumb screw, several holes being provided in said links for receiving said screws.

If, in the case of special kinds of plants, it is desirable to allow the shares to work with a superficial cut the casings $l$ on the beam may be reversed in front and behind as shown in Figs. 10, 11 and 12.

With my horse-hoe I can also so arrange the guiding bars K and beam J as to insure their keeping a horizontal position and in this enforced horizontal position to cause the said beam to project on one side or the other to the extent of half a meter. For this purpose, rigid beams E' (Figs. 1 and 13) are secured to the posts E of the frame B, which posts rest upon the axle C of the traveling wheels, and these beams E' are directed rearward, and obliquely upward and carry in their outer ends a horizontal shaft $f$. On this shaft $f$ two cranks N² are secured by means of screws, and these cranks are at the same distance from each other as the blocks A and each of them lies in a plane directed vertically to the axle of the traveling wheels, and passing through the middle of the corresponding block S, (Fig. 10.) The two cranks N² are connected by means of joints $n^5$, to traction rods V, which again are connected by joints $n^6$ to the corresponding guide bars, $k$. On one end of the shaft $f$ is secured a stop-dish $h$, Figs. 10 and 13, which is provided with two notches $a$, $a'$. By turning the lifting lever $b$ which is attached to the shaft $f$, in one or the other direction a pawl G which is pivoted on the beam E' is caused to engage with one or the other of these notches. If the pawl G be in engagement with the notch $a$ of the stop-wheel $h$, the hoeing machine is in position for transport, in which case the two guiding bars K are situated in the corresponding forked brackets T attached to the blocks S, so as to guard against lateral shifting. If on the contrary the pawl engages with the notch $a'$, as shown in Fig. 13, the two guiding bars K are forced into a horizontal position with the rigid beam to which they are jointed, and are thus in position for hoeing.

In order that there may be no damage to the plants or to the seed even when the draft animal departs to a considerable extent from the direction of the rows of plants, the two joints $n^2$, $n^3$, already mentioned are provided, by means of which the beam J is able to execute a horizontal lateral movement of half a meter on either side, without any corresponding variation in the proper position of the cut, or the depth of entrance of the shares.

Having now particularly described and ascertained the nature of my said invention and in what manner the same is to be performed, I declare that what I claim is—

1. In a horse hoe in combination with its wheels and draft frame, a tine, a caster wheel, a casing for receiving the shanks of the tine and of the caster wheel, one of said shanks being made to slide therein, a guiding bar connecting said casing with the wheel frame, and means for deflecting the guide bar vertically and laterally with reference to the draft frame, substantially as set forth.

2. In a horse hoe, in combination with its wheels and draft frame, a tine, a caster wheel, a casing for receiving the shanks of the tine and the caster wheel, one of said shanks being arranged to slide therein and being vertically adjustable with reference to the other, and a jointed regulating or guiding bar connecting with the draft frame, provided with a horizontal and a vertical pivot, and connecting the draft frame with such casing, and a handle connected with the guiding bar, substantially as set forth.

3. In a horse hoe, in combination with its wheels and draft frame, a tine, a caster wheel, a casing for receiving the shanks of the tine and the caster wheel, a jointed regulating or guiding bar capable of being deflected horizontally and vertically with reference to the draft frame and comprising sections hinged together and capable of horizontal deflection with reference to each other, substantially as set forth.

4. In a horse hoe, in combination with its wheels and draft frame, a tine, a caster wheel, a casing for receiving the shanks of the tine and the caster wheel, a jointed regulating or guiding bar capable of being deflected horizontally and vertically with reference to the draft frame and comprising sections hinged together and capable of horizontal deflection with reference to each other, the casing being hinged to the guiding bar by a horizontal pivot, substantially as set forth.

5. In a horse hoe, in combination with its wheels and draft frame, a tine, a casing wherein such tine moves vertically, a guiding bar connecting such casing with the draft frame, and four guide rollers provided on said casing, two of the rollers adjusted on one side and the other two on the opposite side of the shank carrying the foot piece of the tine, for the purpose of securing true movement of the latter, substantially as set forth.

6. In a horse hoe, in combination with its wheels and draft frame, a tine, a casing to which such tine is attached, a transverse beam supporting said casing, a jointed guiding bar connecting the casing with the draft frame such casing being capable of being reversed in its position with reference to the transverse beam, substantially as set forth.

In testimony whereof I have signed my name to this specification in the presence of two subscribing witnesses.

CARL GINDLER.

Witnesses:
ERNST SIEVERS,
EDUARD KOHLWES.